(No Model.)

C. C. HILL.
SPRING MAKING MACHINE.

No. 400,340. Patented Mar. 26, 1889.

Fig. 1.

Witnesses:
Louis M. F. Whitehead.
Wm. J. Henning.

Inventor:
Christian C. Hill.
by Dayton Poole & Brown
Attorneys.

(No Model.) 5 Sheets—Sheet 2.

C. C. HILL.
SPRING MAKING MACHINE.

No. 400,340. Patented Mar. 26, 1889.

Witnesses:
Louis M. F. Whitehead.
Wm. F. Henning.

Inventor:—
Christian C. Hill.
by Dayton Poole & Brown
Attorneys.

(No Model.) 5 Sheets—Sheet 4.
C. C. HILL.
SPRING MAKING MACHINE.

No. 400,340. Patented Mar. 26, 1889.

Witnesses:—
Louis M. F. Whitehead.
Wm. F. Henning.

Inventor:—
Christian C. Hill.
by Dayton Poole & Brown
Attorneys.

UNITED STATES PATENT OFFICE.

CHRISTIAN C. HILL, OF CHICAGO, ILLINOIS, ASSIGNOR TO CHARLES L. AMES AND ABEL H. FROST, OF SAME PLACE.

SPRING-MAKING MACHINE.

SPECIFICATION forming part of Letters Patent No. 400,340, dated March 26, 1889.

Application filed July 5, 1888. Serial No. 279,001. (No model.)

*To all whom it may concern:*

Be it known that I, CHRISTIAN C. HILL, of Chicago, in the county of Cook and State of Illinois, have invented certain new and useful Improvements in Spring-Making Machines; and I do hereby declare that the following is a full, clear, and exact description thereof, reference being had to the accompanying drawings, and to the letters of reference marked thereon, which form a part of this specification.

This invention relates to a novel machine for the purpose of making spirally-coiled wire springs of cone shape, such as are used for spring-beds and in upholstering.

The invention consists in the matters shown and described hereinafter, and pointed out in the appended claims.

In the accompanying drawings, illustrating my invention, Fig. 5 is a side elevation illustrating that side of the machine opposite to that shown in Fig. 1.

As illustrated in the said drawings, the main frame of the machine consists of two parallel vertical frame-plates, A A, and an arched girt or connecting plate, A', which is bolted to the top of the frame-plates A A, said plate A' being provided at its opposite ends with horizontal arms $A^2 A^2$, which extend beyond or outside of the plates A A, and are provided at their ends with bearings $a\ a$ for the main or mandrel shafts of the machine. At their lower parts the frame-plates are connected by two parallel girts or frame pieces, $A^3 A^3$, herein shown as cast in one piece.

B B' indicate the mandrel-shafts, which are mounted to both rotate and slide longitudinally in the frame of the machine. Said shafts are supported at their outer ends in the bearing $a\ a$ of the frame-arms $A^2 A^2$, while their inner ends are supported by engagement with revolving sleeves $B^2 B^2$, which sleeves are sustained in bearings $a'\ a'$, located, in the instance illustrated, at the upper ends of the frame-plates A, the top frame plate or girt, A', being conveniently constructed to form the tops or upper parts of said bearings, as clearly shown in Fig. 5. Secured to said sleeves $B^2 B^2$ are gear-wheels $B^3 B^3$, by means of which rotary motion is transmitted to the said sleeves, said gear-wheels being driven in a manner hereinafter described. The said shafts B B' are provided with longitudinal grooves $b\ b$, which engage splines $b'$ in the sleeves $B^2$, so that rotary motion may be transmitted from the sleeves to the shafts, while at the same time the shafts may be moved freely endwise through the sleeves.

Figure 1:
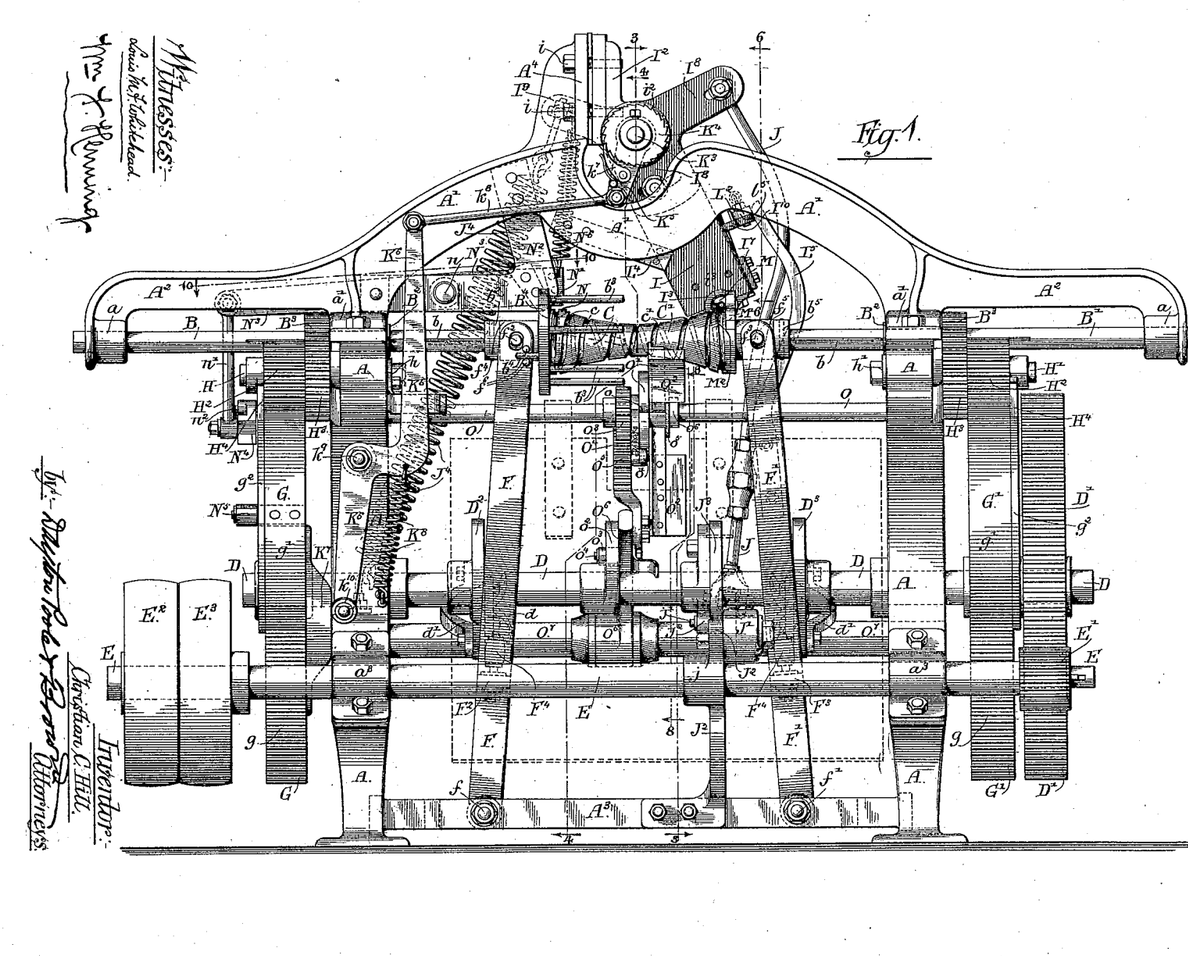
Figure 1 is a side elevation of a machine embodying my invention as seen from that side of the machine at which the finished springs are discharged.

C C' are two forming-mandrels, which are mounted upon the inner or adjacent ends of the shafts B B', and upon or about which the wire is wrapped or wound to give shape to the springs. The said mandrels are tapered from their outer ends inwardly, or, in other words, are made largest at their ends which are attached to the shafts B B' and smallest at their ends which are adjacent to each other. When the mandrels are in position for the wrapping or winding of the wire thereon, their adjacent ends are brought into close contact with each other, as shown in Fig. 1, so that the two mandrels form a double cone having the shape of a conical wire spring as usually made. In the surfaces of the said mandrels are formed spiral grooves $c\ c'$, within which the wire is laid in wrapping it about the mandrels, said grooves being arranged to form a continuous spiral when the mandrels are brought together end to end in the manner above described. The mandrels are made movable toward and from each other for the purpose of enabling the finished spring to be discharged therefrom, the endwise movement of the mandrel being accomplished by thrusting the shafts B B', to which said mandrels are attached outwardly, the said shafts having endwise movement in their bearings in the manner above described for this purpose. The wire is wrapped about the mandrel by giving rotary motion to the latter, the wire being fed to the mandrels by means of a movable guide which swings in a vertical plane and in an arc approximately corresponding with the curvature of the conical surfaces of the mandrels, and which is moved longitudinally of the mandrel at such speed that the wire will pass straight from the said guide to the groove of the mandrel as the latter is rotated, thereby enabling the wire to be laid smoothly within the groove in the formation of the spring.

The devices employed in the machine shown for giving longitudinal motion to the mandrel-supporting shafts B and B' will now be described.

Figures 4, 7, 8, 9, 10:
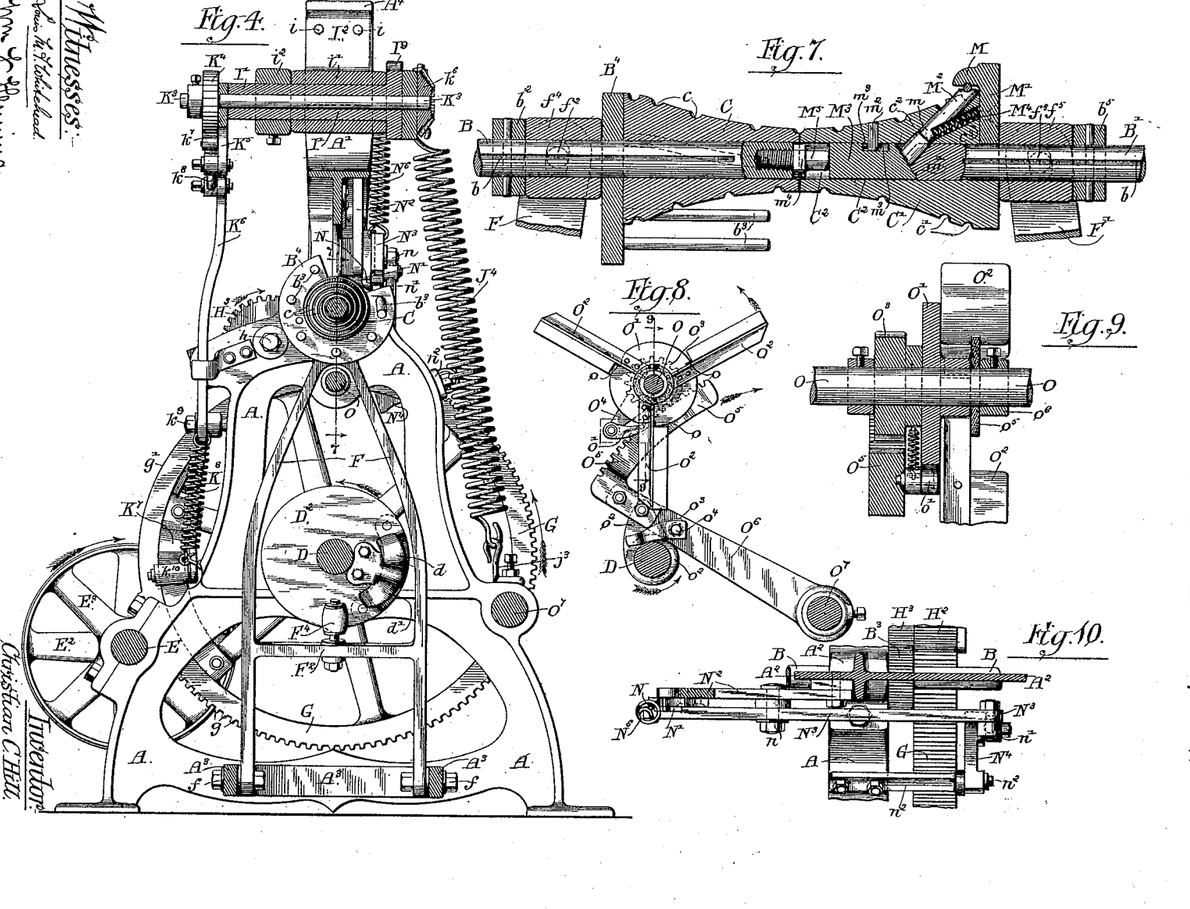
Fig. 4 is a vertical section taken upon line 4 4 of Fig. 1.
Fig. 7 is an enlarged detail section through the forming-mandrel, taken upon line 7 7 of Fig. 4.
Fig. 8 is a detail section taken upon line 8 8 of Fig. 1.
Fig. 9 is a section taken upon line 9 9 of Fig. 8.
Fig. 10 is a sectional plan view taken upon line 10 10 of Figs. 1 and 5.

D is the main or cam shaft of the machine. Said shaft is mounted in bearings $a^2 a^2$ in the frame-plates A below and parallel with the mandrel-shafts B and B'. At one end of the machine, outside of the frame-plates A, said shaft D is provided with a heavy drive-wheel, D'. The shaft D is driven from a counter-shaft, E, by means of a pinion, E', intermeshing with the wheel D'. The counter-shaft E has bearings at $a^3 a^3$ upon the frame-plates A, and is provided with fast and loose belt-pulleys $E^2 E^3$, over which is placed the driving-belt for giving motion to the machine. For giving longitudinal movement to the mandrel-shafts B and B' the shaft D is provided with two cams, $D^2 D^3$, arranged to act upon vertically-arranged levers F F', which levers are pivoted at their ends by means of pivots $f f'$ to the longitudinal girts $A^3 A^3$, and are forked at their upper ends and engaged with pins $f^2 f^3$, affixed in rings or sleeves $f^4 f^5$, which rings or sleeves are mounted upon the shafts B and B' adjacent to the mandrels. Said sleeves $f^4 f^5$, as more clearly shown in Fig. 7, are held from endwise movement upon the shafts B and B', while said shafts are adapted to turn freely within the collars, thereby enabling the shafts to be moved endwise by the action of the levers F and F' when the latter are shifted by means of cams $D^2 D^3$.

In the particular construction illustrated the collar $f^4$ is held between a ring, $b^2$, secured to the shaft B, and a flat plate, $B^4$, mounted upon the said shaft in contact with the mandrel C. Said plate $B^4$ is provided with a series of pins, $b^3 b^3$, arranged around the mandrel C, parallel with the same, for the purpose of partially confining the loose end of the spring at the moment the same is severed from the blank-wire, as hereinafter fully set forth. Said plate $B^4$ is held from turning with the shaft and mandrel by means of a pin, $b^4$, in the plate, which is engaged with two pins, $f^6 f^6$, in the upper end of the lever F. The sleeve $f^5$ is held from endwise movement upon the shaft B' by being confined between a ring, $b^5$, secured to the shaft, and the adjacent end of the mandrel C', against which the said sleeve bears.

The levers F F' are desirably made duplex or in two integral parts, arranged to pass at opposite sides of the shaft D, the lower ends of the parts of said levers being connected by horizontal cross-pieces $F^2 F^3$, upon which are mounted anti-friction rollers $F^4 F^4$, which engage the cams $D^2 D^3$. Said cams, as shown, consist of flat plates or disks, against which the rollers $F^4 F^4$ rest during the greater part of the revolution of the shaft, the faces of the cams against which the rollers act being arranged to hold the upper ends of said levers F F' at the inward limit of their throw and thereby retain the mandrels C and C' in contact with each other during the winding of the spring. In the said cams and extending through somewhat less than a fourth of the circumference of the same are provided peripheral cam-grooves, formed in the particular instance illustrated by cutting away part of the periphery of the cam and bolting to each of the said disks two cam-plates, $d d'$, having adjacent curved surfaces forming opposite walls of the cam-grooves. Said plates are so shaped as to swing or carry the rollers $F^4$ outwardly, thereby moving the upper ends of the levers F and F' away from each other and separating the mandrels C and C' to allow the discharge of the finished springs.

Intermittent rotary motion is given to the mandrel-shafts B and B' by means as follows: Upon the shaft D, at the opposite end of the machine, exterior to the frame-plates A A, are located mutilated gear-wheels G G', said gear-wheels having gear-teeth $g$, extending partially around the same, and intermediate smooth surfaces, $g' g'$. In their parts adjacent to the smooth surfaces $g' g'$ are located bearing-flanges $g^2 g^2$, the external faces of which are smooth and cylindric.

H H' are short hollow shafts mounted upon bearing-studs $h h'$, secured in the frame-plates A, adjacent to the gear-wheels G and G' and near the shafts B and B'. Said shafts H H' are provided with gear-pinions $H^2 H^2$, adapted to intermesh with the gear-teeth $g g$ of the gear-wheels G G'. Said shafts are also provided with gear-pinions $H^3 H^3$, intermeshing with the gear-wheels $B^3 B^3$, which are attached to the sleeves $B^2 B^2$, surrounding the said shafts B B'. To the pinions $H^2$ are secured flat bearing-plates $H^4 H^4$, the edges of which are constructed to fit and ride upon the bearing-flanges $g^2 g^2$. The mutilated gears G and G', together with the pinions $H^2 H^2$, intermeshing therewith and provided with plates $H^4 H^4$ in the manner described, afford a means of giving intermittent rotary motion to the shafts B and B' in a manner heretofore well known and readily understood. The periods of rest and motion in the said shafts B and B' are so timed that the said mandrel-shafts will be rotated during the time the mandrels are in contact with each other, but will be held from rotation while the mandrels are being separated and brought together, in the manner hereinbefore described. The bearing-studs $h$ and $h'$ are herein shown as secured in slots $a^4 a^4$ in the frame-plates A A, to allow the gear-pinions $H^3 H^3$ to be moved toward and from the gear-pinions $B^3 B^3$.

The devices for guiding the wire to the mandrels in the act of forming the springs are constructed as follows: I is an oscillating arm which carries at its lower end the guiding devices for the wire, made as hereinafter described. Said arm is mounted upon a hollow shaft or sleeve, I', having bearings in a bracket, $I^2$, which is attached by means of bolts $i$ $i$ to a vertical arm, $A^4$, which extends upwardly from the top of the frame-girt A'. The said hollow shaft or sleeve I' is arranged transversely of the mandrel-shafts B B' at the top of the machine and over the mandrels C C'. The lower end of the arm I is arranged to swing in a horizontal plane at one side of the central vertical plane of the machine, the lower or free end of the arm being horizontally opposite the mandrels when the latter are in contact with each other. Said sleeve I' is extended somewhat past the bearing $i'$ in the bracket $I^2$, and upon the said sleeve is secured a collar, $i^2$, Figs. 3 and 4, which holds the sleeve from moving endwise in the bearing. At its lower or free end the arm I is provided with a wire-guide, $I^3$, consisting of a central apertured plug held in a socket, $i^3$, in the lower end of the arm and secured in said socket by a set-screw, $i^4$, Figs. 12 and 13. The wire-guide $I^3$ is arranged horizontally at the side of the arm adjacent to the mandrel, and its guide-aperture is approximately tangential to the conical surfaces of the mandrels in all positions of the carrying-arm I. Said guide thus serves to give proper direction to the wire as it passes from the arm toward the said mandrel.

$I^4$ is a tension device attached to the lower end of the arm I exterior to the wire-guide, said tension device being intended for giving the necessary tension to the wire as the latter is drawn through the guide in the rotation of the forming-mandrels. Said tension device consists, as herein shown, Figs. 5, 12, and 13, of two plates, $I^5 I^6$, provided with opposing grooves $i^5 i^5$, which together form the aperture through which the wire passes. Said plates $I^5 I^6$ are supported upon an arm or bracket, $I^7$, attached to the lower end of the arm I by means of bolts $i^6 i^6$, which pass through said plates $I^5 I^6$ and are secured in the said arm $I^7$. Around the said bolts $i^6 i^6$, between the heads thereof and the plate $I^6$, are placed coiled springs $i^7 i^7$. Said springs serve to press the said plates toward each other and to thereby clamp the wire with a greater or less pressure, according to the tension of the springs. By turning the bolts $i^6 i^6$ the tension of the said springs may be obviously increased or decreased, as desired.

As hereinbefore stated, the arm I, together with the wire-guide and tension device thereon, is moved or swung lengthwise of the mandrels C and C' during the rotation of said mandrels, so that the wire shall be fed smoothly and evenly to the grooves $c c'$ in the winding of the spring. The devices illustrated in the accompanying drawings for giving oscillatory motion to the said arm I are as follows:

$I^8$ is a rigid arm attached to the arm I adjacent to the pivotal support of the latter and extending outwardly about at right angles therefrom. Pivotally connected with the outer end of said arm $I^8$ is a connecting-rod, J, which extends downwardly to and is connected with the free end of a horizontally-arranged lever, J', which extends transversely of the machine beneath the shaft D, and is pivoted at the side of the machine to a bracket, $J^2$, which bracket is bolted to one of the longitudinal frame-girts, $A^3$, and is provided with a bearing, $j$, for the drive-shaft E. The lever J' is provided with a pin or stud, $j'$, carrying an anti-friction roller, $j^2$, which engages the periphery of a cam, $J^3$, mounted upon the shaft D. Said cam acts to depress the free end of the lever J', thereby swinging the free end of the arm I lengthwise of the forming-mandrels C and C'. The roller $j^2$ is arranged to press upwardly against the surface of the cam $J^3$, so that said cam gives the downward movement only to the arm J', the return movement of the arm I (acting to lift said arm J') being produced by means of a spiral spring, $J^4$, connected at its upper end with an arm, $I^9$, attached to the guide-carrying arm I and at its lower end to the frame. Said lower end of the spring is herein shown as attached to the frame-plate A by means of a hook, $j^3$, bolted to the frame-plate in the manner illustrated. The arms $I^8$ and $I^9$ extend outwardly from the guide-carrying arm I in opposite directions, so that a downward pull upon the outer end of the arm $I^8$ moves the wire-guide in one direction, while the action of the spring, which pulls downward upon the arm $I^9$, serves to swing said guide in the opposite direction.

In the operation of the parts above described the arm I, carrying the wire-guide, begins its movement longitudinally of the mandrels at the same time that the latter begin to turn for winding the wire upon the same, and the speed of the end of said arm I and wire-guide carried thereby is so regulated with reference to the spiral curvature of the grooves $c c'$ that said guide follows the said grooves $c c'$ as the mandrel is rotated, thus causing the wire to be laid smoothly within said grooves, the wire being held taut by the tension device I⁴, so that it is drawn and held tightly within the grooves and thus accurately given the form of the mandrel.

The mandrel is provided with a gripping device adapted to grasp or seize the end of the wire previous to the winding operation, and, in connection with such gripping device, an automatic feeding apparatus is provided for automatically thrusting forward the end of the wire into the gripping device before the beginning of each rotary movement of the mandrels by which a spring is formed. The said devices for feeding forward the wire are constructed as follows:

K K′, Figs. 3, 5, 6, 11, 12, 13, 14, and 15, are two parallel shafts mounted upon the arm I and provided at their lower ends with two grooved wheels, k k′, (shown more clearly in Figs. 11 and 12,) the contact-points of which are arranged in alignment with the path of the wire through the guide I³ and tension device I⁴, so that when said wheels are brought together they will engage said wire. Said wheels k k′ are located between the said tension device and the guide I³, so that when they are in operation they will act to draw the wire through the tension device and force it forward through the guide, which latter is provided with a guide-aperture of such size as to allow the free passage of the wire through it.

Figures 7, 15:
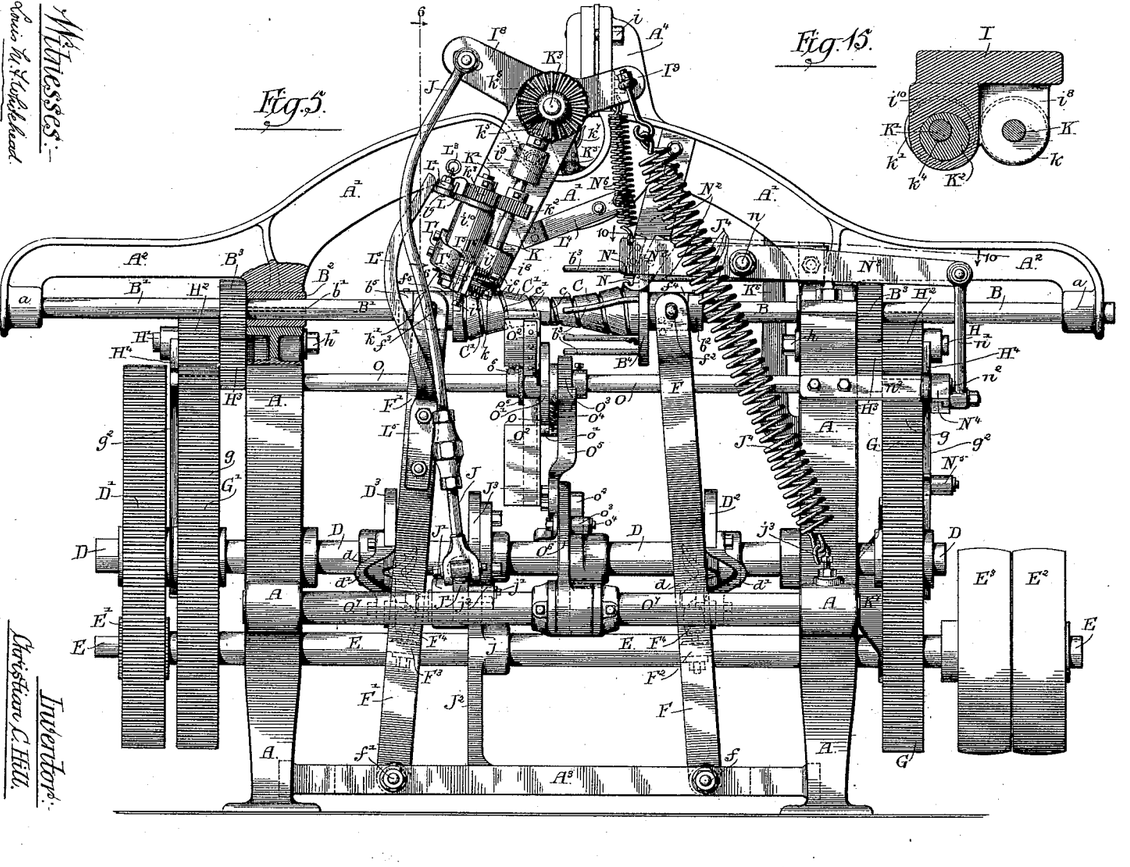
Fig. 15 is a detail section taken upon line 15 15 of Fig. 11.
Figures 11, 12, 13, 14:
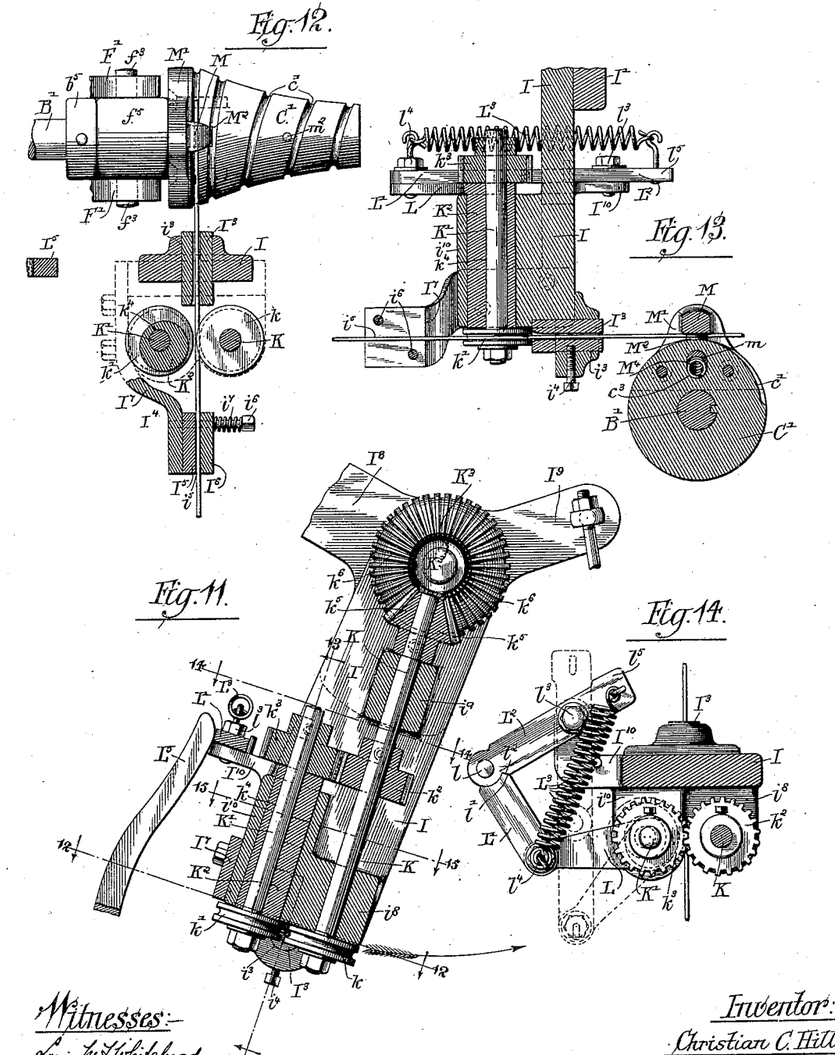
Fig. 11 is an enlarged detail section taken upon line 11 11 of Fig. 6.
Fig. 12 is a detail section taken upon line 12 12 of Fig. 11.
Fig. 13 is a detail section taken upon line 13 13 of Fig. 11.
Fig. 14 is a detail section taken upon line 14 14 of Fig. 11.

The shaft K is mounted in bearings i⁸ i⁹, Figs. 5, 11, and 15, herein shown as formed by lugs cast upon the outer face of the arm I, and said shaft K is provided with a gear-wheel, k², intermeshing with a gear-wheel, k³, of the same size, upon the shaft K′. Said shaft K′ is mounted in an eccentric bearing-aperture, k⁴, formed in a cylindric plug, K², Figs. 11, 13, and 15, which plug is mounted in an elongated bearing, i¹⁰, cast upon the arm I, at one side of and adjacent to the bearing i⁸, the plug K² being arranged to turn about an axis parallel with the shaft K. The purpose of mounting the shaft K′ eccentrically in the plug K² is to enable the said shaft K′ to be shifted bodily toward the shaft K, this movement of the shaft K′ being accomplished by giving a partial rotation to the said plug. The shaft K′ is made movable toward and from the shaft K for the purpose of enabling the rollers k and k′ to be brought together to grip and feed forward the wire prior to the beginning of the winding of the same upon the mandrel, the said rollers being released from the wire, (after the same has been fed forward a considerable distance to engage the gripping devices of the mandrel C,) so as to enable the said wire to be drawn freely past said rollers as the mandrels are turned for winding the wire thereon.

The devices illustrated for giving partial rotary movement to the plug K² will be hereinafter described.

The means employed for turning the said rollers k k′ to feed forward the wire are as follows: The shaft K, supporting one, k, of said rollers, is arranged radially with reference to the supporting-shaft I′ of the arm I, and said shaft I is provided upon its end, above the bearing i⁹ and adjacent to said hollow shaft I′, with a beveled gear-pinion, k⁵, which intermeshes with a beveled gear-wheel, k⁶, mounted upon a shaft, K³, which passes axially through and has bearing in the hollow shaft I′, as clearly shown in Fig. 3. The shaft K and rollers k k′ are driven, at required intervals, by means applied to rotate the said shaft K³, the rotation of said shaft being transmitted to the shaft K and from said shaft K to the shaft K′ by means of gear-wheels k² k³.

Figure 3:
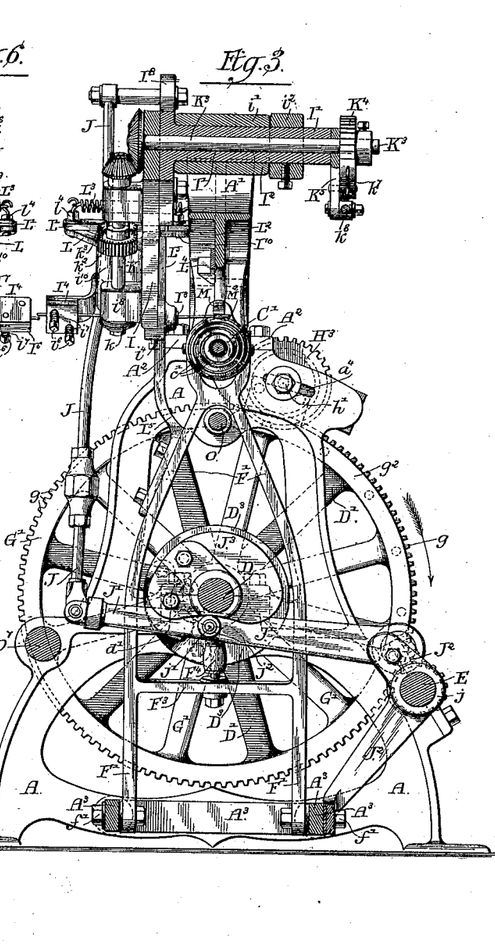
Fig. 3 is a central vertical section of the same, taken upon line 3 3 of Fig. 1.

For giving rotary movement to the said shaft K³ for the purpose described, devices are provided which are more clearly shown in Figs. 1, 3, and 4.

K⁴ is a ratchet-wheel, attached to the end of the shaft K³, which protrudes from the hollow shaft I′, and K⁵ is an oscillating arm, which is pivotally supported upon said shaft K³, and is provided with a spring-pawl, k⁷, engaging the ratchet-wheel K⁴. The free end of the oscillating arm K⁵ is connected, by means of a horizontally-arranged connecting-rod, k⁸, with a vertically-arranged lever, K⁶, pivoted between its ends, by means of a pivot-pin, k⁹, to one of the frame-plates A. Said lever K is provided at its lower end with an anti-friction roller, k¹⁰, adapted to act against a cam projection, K⁷, upon the inner face of the gear-wheel G, Figs. 1 and 4, the said roller k¹⁰ being held in contact with the cam-plate K⁷ by means of a spring, K⁸, attached to the lever K⁶ and to the machine-frame. In the operation of these parts an oscillatory movement is given to the lever K⁶ and to the oscillating arm K⁵ once during each rotation of the gear-wheel G, so that the shaft K³ is given a partial rotation and the feed-rollers k k′ thereby turned to carry forward the wire once during each rotation of the shaft D, by which the several movements of the machine necessary to make a single spring are accomplished. The cam-plate K⁷ is so located upon the wheel G that this movement of the parts for feeding forward the wire occurs before the rotation of the mandrels C and C′ begins, and while the said mandrels are approaching each other after having been separated to allow the discharge of the finished spring therefrom.

Figures 2, 6:
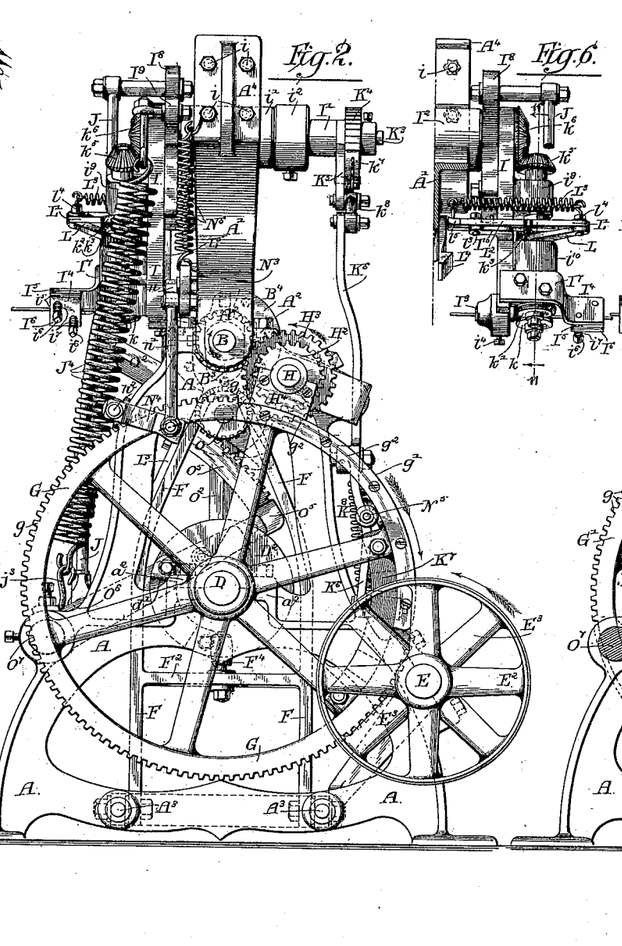
Fig. 2 is an end elevation of the same.
Fig. 6 is a detail sectional elevation taken upon line 6 6 of Figs. 1 and 5.

The means illustrated for throwing together the rollers k k′ for the purpose of gripping the wire at the time said rollers are turned for feeding forward said wire are made as follows:

L, Figs. 5, 6, and 14, is an arm attached to the upper end of the cylindric plug K², and adapted to partially turn said plug when the arm is oscillated.

L′ L² are two toggle-links connected with each other by a central pivot, l, the said toggle-links being pivoted at their outer ends, one, L′, to the arm L, and the other, L², to a rigid arm, I¹⁰, extending outwardly at one side of the arm I. The said toggle-links $L'$ $L^2$ are provided at their inner faces, adjacent to the pivot $l$, with shoulders $l'$ $l^2$, adapted to come together and limit the flexure of the toggle-links when the latter stand at about right angles with each other, as illustrated in Fig. 14. The link $L^2$ is extended past the pivot $l^3$, so as to form an arm, $l^5$, which reaches inwardly toward the frame-plate $A'$. To the end of said arm $l^5$ remote from the pivot $l^3$ is attached one end of a coiled spring, $L^3$, the opposite end of which spring is attached to the pivot $l^4$, which connects the link $L'$ with the arm L. Said spring, when thus arranged, tends to hold the toggle-links in their flexed position and with the shoulders $l'$ $l^2$ in contact with each other, as clearly shown in Fig. 14. When the said links are flexed and the spring contracted, as shown in full lines in Fig. 14, the free end of the arm L is thrown inwardly and the plug $K^2$ rotated in such position that the rollers $k$ $k'$ are in contact with the wire. When, however, the said toggle-links are straightened out and the spring expanded, the arm L is thrust outwardly and the plug $K^2$ brought to a position in which the roller $k'$ is free from the roller $k$. The said toggle-links $L'$ $L^2$ are thrust into their flexed position by contact of the projecting end $l^5$ of the link $L^2$ with a spring-detent, $L^4$, Figs. 5, 3, and 6, which is attached to the frame-plate $A'$ in the path of the said part $l^5$ of the arm as the oscillating arm I is moved. The said links are straightened out for the purpose of causing the feed-rollers to release the wire by the action of a stationary arm, $L^5$, upon the advance edge of one of the toggle-links (in the construction illustrated the toggle-link $L'$) of an arm, $L^5$, attached to an adjacent part of the machine, the pressure of said arm $L^5$ against the toggle-link, as the wire-guide carrier is moved bodily toward the said arm, acting to press the central joint of the toggles backwardly, and thus expand the spring $L^3$ and straighten out the toggle-links. The spring-detent $L^4$ is constructed to act only as the carrier-arm I moves backwardly or returns to its starting-point opposite the larger end of the mandrel $C'$, said detent being provided with an inclined face or surface for engagement with the rear edge of the link $L^2$, whereby the detent will be pushed outwardly to allow the passage of the link in the succeeding forward movement of the said carrier-arm. Said detent $L^4$ is arranged in such position that it will flex the toggle-joint, and thereby bring the feeding-rollers into contact with the wire during the backward stroke or movement of the wire-guide carrier, so that the wire will be fed forward toward the mandrel during the latter part of the return stroke or movement of said carrier.

The arm $L^5$ is located in such position that it will engage the toggle-links and straighten said toggle-links to release the wire at the termination of the backward movement of the said carrier, said arms being so arranged that the links will be brought into alignment with each other at the moment that the movement of said carrier ceases.

In the particular construction illustrated the arm $L^5$ is attached to the lever $F'$, by which endwise movement is given to the shaft $B'$ and mandrel $C'$. Said arm $L^5$ is swung or moved with the said lever $F'$, and is thus brought into position for contact with the toggle-links $L'$ and $L^2$ at the termination of the forward movement of the mandrel $C'$, the parts being so arranged that the said toggle-links are straightened out by the pressure of said arm $L^5$ at the moment the said mandrels are brought together and are in position for the winding and wrapping of the wire about them. The movement of the said carrier is so timed that the wire-guide is brought into its normal position or in position to move the wire forward to the gripping-jaws while the mandrels are separated, the wire being fed forward while the mandrel is advancing, so that the end of the wire will extend across or over the mandrel in position to be engaged with the jaws of the gripping device as the mandrel advances. The said arm $L^5$ being moved with the mandrel, said arm will act upon the toggle-links $L'$ $L^2$ to straighten out the latter, and thereby release the feed-rollers from the wire, at the moment said mandrel $C'$ terminates its forward movement and comes into contact with the mandrel C. Said gripping device upon the mandrel C, by which the end of the wire is gripped and held during the rotation of the mandrel, is more clearly shown in Figs. 7 and 13, and is constructed as follows:

M is the stationary jaw of the gripping device. Said jaw is arranged horizontally in such manner as to overhang the larger part or base of the mandrel, and is attached to and supported by a radially-arranged plate, $M'$, rigidly secured to the base of the mandrel in the manner clearly shown in Fig. 7.

$M^2$ is the movable jaw of the gripper, which is formed upon the end of a sliding bar, $m$, located in an oblique guide-aperture, $c^2$, within the mandrel C. The guide-aperture $c^2$ at its inner end intersects a centrally-arranged axial aperture, $C^2$, which extends into the mandrel from the smaller end thereof. Within said passage $C^2$ is located a sliding block, $M^3$, having an inclined or oblique end surface, $m'$, against which bears the inner end of the sliding bar $m$, the longitudinal movement of the block $M^3$ being limited by means of a pin, $m^2$, which enters a slot, $m^3$, in the said block $M^3$. The sliding rod $m$ is held at the inward limit of its movement, so as to retain the jaw $M^2$ separate from the jaw M, by means of a coiled spring, $M^4$, located within the mandrel and acting upon the said rod $m$.

In the particular construction herein shown the spring $M^4$ is located in an oblique passage, $c^3$, bored into the body of the mandrel from the seat of the plate $M'$, and is adapted to bear against the end surface of a V-shaped notch in the side of the rod $m$, the spring being held in place on the said plate by pressing at its outer end against the plate M'. The pressure of the spring $M^4$, acting to throw the rod $m$ inwardly, also operates to thrust and hold the sliding block $M^3$ at the outward limit of its movement, owing to the pressure of the said rod $m$ against the inclined or oblique rear surface of the said block $M^3$. The movable gripping-jaw $M^2$ is actuated to grasp the wire by means of a projection upon the mandrel C, arranged to come in contact with the sliding block $M^3$, and to thereby thrust said block inwardly and force the rod $m$ upwardly or outwardly against the action of the spring $M^4$.

In the particular construction of the parts herein illustrated the shaft B is extended nearly through the mandrel C, and a pin, $M^5$, is secured by a screw-threaded connection to the end of the said shaft B, said pin extending beyond the face of the smaller end of the mandrel C, so as to enter the passage $C^2$ of the mandrel C', and act upon the sliding block $M^3$ in the manner above described. To admit of adjustment of the pin $M^5$, the latter is provided with flat faces $m^4$ for the application of a wrench. The gripping device in the construction described being operated entirely by the endwise movement of the mandrel, it is entirely obvious that the wire will be gripped the moment the mandrels are brought together in position for operation and before the rotation of the said mandrels begins. When the mandrels are approaching each other, the jaws of the gripping device are open, the arm I and wire-guide at this time being in motion toward the larger end of the mandrel C', and the feed-rollers being engaged with the wire so as to feed the latter forward. The motions of the parts are so adjusted that the end of the wire reaches a point opposite the gripping-jaws, and the wire ceases its forward motion shortly before the mandrels come together. The jaws are thus caused to pass on either side of the wire just before the gripping-jaws are closed by the action of the pin $M^5$, so that the wire is firmly gripped when the mandrels are brought into contact with each other and are in readiness to begin their forward movement.

For the purpose of automatically severing from the main part of the wire the wire which has been wrapped about the mandrels to form the spring, an automatic cutting device is provided, which is constructed as follows:

N N' are the two jaws of the cutting device, the same being located horizontally opposite the larger end of the mandrel C and in a line between the groove $c$ in its part adjacent to the larger end of the mandrel and the wire-guide $I^3$ when the latter is in position adjacent to the said larger end of the mandrel C. The jaws N N' are thus located in such position that as the wire-guide moves horizontally toward the larger end of the mandrel C the wire will be carried between the said jaws and into position for the operation of the latter thereon at the moment the winding is completed.

N is the stationary jaw of the cutting device, which jaw in the instance illustrated is rigidly attached to a flat metal arm or bracket, $N^2$, of L shape in form, and attached at both ends to the arched frame-plate A'. The movable jaw N' is attached to the end of a horizontal lever, $N^3$, which is pivoted at $n$ to the arm $N^2$. To the opposite end of said lever $N^3$ is attached a connecting-rod, $n'$, the lower end of which is pivoted to a swinging dog, $N^4$, Figs. 2 and 10, said dog being pivoted upon a stud, $n^2$, attached to the frame-plate A. Said dog $N^4$ is located adjacent to the periphery of the gear-wheel G, with the free end of the said dog extending over the outer face of the wheel and in position to engage a pin, $N^5$, attached to the said gear-wheel. Said dog $N^4$ is so located, as shown in Fig. 2, that in the revolution of the wheel the pin $N^5$ will encounter the lower surface of the dog, and thereby lift its free end, with the effect of elevating the outer end of the lever $N^3$ and depressing the inner end of said lever, to which the movable cutter N' is attached. Movement is given to the lever $N^3$ in a reverse direction for separating the cutting-jaws by means of a coiled spring, $N^6$, connected to the said lever $N^3$ and to the machine-frame above the same, as clearly shown in Fig. 5. The pin $N^5$ is located upon the wheel G in such position as to strike the dog $N^4$ and actuate the knife at the moment, or shortly after, the mandrel C has completed its rotation.

The pins $b^3$ $b^3$ upon the plate $B^4$, which is mounted upon the shaft D adjacent to the large end of the mandrel C, in the manner hereinbefore described, operate to prevent the end of the wire, suddenly freed by the action of the cutting devices, in the manner described, from springing outwardly to an inconvenient or dangerous extent. Said plate $B^4$ is cut away or notched opposite the cutting-jaws, in the manner clearly shown in Fig. 4, to give room for said jaws.

For the purpose of accomplishing the discharge of the finished spring at one side of the machine, as said springs are dropped from the mandrels C C' in the separation of the latter, devices are provided, as follows:

O is a horizontal shaft, supported at its ends in the frame-plates A A, beneath and parallel with the mandrels' shafts B and B'. Upon said shaft O, beneath the mandrels C and C', is located a disk, O', adapted to turn upon the shaft and provided with three arms or wings, $O^2$ $O^2$ $O^2$, made of such width as to receive and hold a spring dropped upon and between them from the mandrels. The disk O' is provided with three ratchet-teeth or notches, $o$ $o$ $o$. $O^3$ is a gear-wheel mounted upon the shaft adjacent to the disk O', and provided with a radial arm, $O^4$, which carries at its end a spring-pawl, $o'$, adapted to engage the notches $o\ o\ o$. Intermeshing with the gear-wheel $O^3$ is a gear-segment, $O^5$, mounted upon the end of an oscillating arm, $O^6$, which is mounted upon a rock-shaft, $O^7$, having bearings at its ends in the frame-plates A A of the machine. The arm $O^6$ extends over and adjacent to the main shaft D of the machine, and said shaft is provided with a cam or wiper, $o^2$, arranged to act upon an anti-friction roller, $o^3$, which turns upon a pin or stud, $o^4$, in the said arm $O^6$. The said cam $o^2$ is arranged to move or swing the arm $O^6$ upwardly once at each revolution of the shaft D, to thereby give a partial rotation to the gear-wheel $O^3$. At each partial revolution of the said gear-wheel the pawl $o'$, which is engaged with one of the notches $o$ of the disk $O'$, is turned through a third of a revolution, and the said disk and arms $O^2\ O^2$ are thereby revolved through the same distance. Inasmuch as the shaft D makes one revolution during the making of each spring, the said arms $O^2\ O^2$ are advanced to carry forward and discharge from the machine each spring as the same is completed and dropped from the mandrels. The free rotation of the disk $O'$ upon the shaft O is prevented by means of a leather washer, $o^5$, placed between the hub of the disk and a collar, $o^6$, attached to the shaft.

As far as the main features of my invention are concerned, it is obvious that the same may be carried out by the employment of details made otherwise than in the particular manner shown, and my invention is not, therefore, limited to such details of construction, except as the same are specifically herein claimed.

I claim as my invention—

1. A machine for making conical wire springs, comprising two rotating conical mandrels arranged end to end, and which are movable longitudinally toward and from each other, and a wire-guide which is movable in a direction longitudinally of the mandrels, substantially as described.

2. A machine for making conical wire springs, comprising two rotating conical mandrels located end to end, with their smaller ends together, and an oscillating wire-guide moving in an arc approximately corresponding with the form or outline of one side of the mandrels, substantially as described.

3. The combination, with two conical mandrels placed end to end, of means for giving intermittent rotary motion to said mandrels, means for giving reciprocatory motion to said mandrels toward and from each other, and a wire-guide movable in a direction longitudinally of the mandrels, substantially as described.

4. The combination, with two conical mandrels arranged end to end, of two shafts supporting said mandrels, said shafts being mounted in bearings affording both longitudinal and rotary motion therein, means for giving intermittent rotary motion to said shafts, means giving intermittent endwise reciprocatory motion to said shafts, and a wire-guide movable endwise with relation to the mandrels, substantially as described.

5. The combination, with two conical mandrels arranged end to end, of two shafts supporting the same, said shafts being mounted in bearings affording both endwise and rotary motion of the shafts, said shafts being provided with longitudinal grooves, of rotating sleeves surrounding said shafts and provided with feathers engaging said grooves in the shafts, driving-connections engaging said sleeves and giving intermittent rotary motion thereto, levers arranged transversely with relation to the shafts and engaged at their ends therewith, a shaft provided with two cams acting upon said levers to give endwise motion to the shafts, and a wire-guide movable endwise with relation to the mandrels, substantially as described.

6. The combination, with the rotating and longitudinally-movable conical mandrels arranged end to end, of a wire-guide movable longitudinally with reference to the mandrels, a wire-gripper on one of said mandrels, and an intermittingly-acting wire-feeding device connected to and moving with said wire-guide, substantially as described.

7. The combination, with two rotating and longitudinally-movable conical mandrels arranged end to end, of a wire-guide movable longitudinally with reference to the mandrels, a wire-gripper on one of said mandrels, an intemittingly-acting wire-feeding device connected to and moving with said wire-guide, and a tension device, also connected and moving with the wire-guide, substantially as described.

8. The combination, with two revolving and longitudinally-reciprocating mandrels arranged end to end, of a wire-gripper upon one of said mandrels, a wire-guide movable longitudinally with relation to said mandrels, an intermittingly-acting feeding device movable with said wire-guide and engaging the wire passing through the same, and a cutting device arranged in alignment with the said wire-guide when the latter is at the limit of its movement away from the wire-gripper, substantially as described.

9. The combination, with two rotating and longitudinally-reciprocating conical mandrels, of a wire-guide movable longitudinally with relation to the mandrels, a wire-gripper upon one of said mandrels, an oscillating arm carrying said wire-guide, a feeding device mounted upon said arm, and a cutting device arranged opposite the larger end of the other of said mandrels, substantially as described.

10. The combination, with two longitudinally-reciprocating revolving conical mandrels arranged end to end, of an oscillating wire-guide, a pivotally-supported arm carrying said wire-guide, and means for giving oscillatory movement to said pivoted arm, substantially as described.

11. The combination, with two rotating and longitudinally-reciprocating conical mandrels, of a wire-guide, a pivotally-supported oscillating arm carrying said guide, feeding-rollers mounted upon said arm and engaging the wire passing through the guide, a wire-gripper upon one of said conical mandrels, and means giving intermittent rotary motion to said feed-rollers constructed to turn the rollers as the wire-guide approaches said wire-gripper, substantially as described.

12. The combination, with two revolving longitudinally-reciprocating conical mandrels arranged end to end, of a wire-guide movable longitudinally with relation to the mandrels, a pivotally-supported swinging arm carrying a rigid arm extending outwardly from the said wire-guide-carrying arm, a rotating cam, a lever engaging said cam, and a connecting-rod connecting said lever with the said arm of the wire-guide-carrying arm, substantially as described.

13. The combination, with two rotating and longitudinally-reciprocating conical mandrels arranged end to end, of a wire-guide, a pivotally-supported oscillating arm carrying said guide, feed-rollers mounted upon said arm, one of said feed-rollers being movable toward and from the other feed-roller, means giving intermittent rotary movement to said feed-rollers, and means for moving one of said rollers toward and from the other roller, substantially as described.

14. The combination, with two rotating and longitudinally-reciprocating conical mandrels arranged end to end, of a wire-guide, a pivotally-supported oscillating arm carrying said wire-guide, feed-rollers mounted upon said oscillating arm, and means for giving intermittent rotary movement to said feed-rollers, comprising a shaft, K, connected with one of said feed-rollers, gearing connecting said shaft K with the other feed-roller, a shaft, $K^3$, arranged concentrically with relation to the pivotal axis of the said oscillating arm, gearing connecting said shafts K and $K^3$, an oscillating arm, $K^5$, a pawl-and-ratchet connection between said arm $K^5$ and the shaft $K^3$, and means for giving intermittent oscillatory movement to said arm $K^5$, substantially as described.

15. The combination, with the rotating and longitudinally-reciprocating conical mandrels C and C', of a wire-guide, a pivotally-supported arm carrying said wire-guide, feed-rollers mounted upon said arm, a shaft, K, mounted upon said arm and giving motion to said feed-rollers, a shaft, $K^3$, arranged concentric with the pivotal axis of the said arm, gearing connecting said shafts K and $K^3$, an oscillating arm, $K^5$, mounted concentrically with the shaft $K^3$, a pawl-and-ratchet connection between said oscillating arm $K^5$ and the shaft $K^3$, a lever, $K^6$, connected with the said oscillating arm $K^5$, a spring applied to said lever $K^6$ for moving the latter in one direction, and a drive-wheel, G, by which rotary motion is given to one of said mandrels, said wheel being provided with a cam, $K^7$, which engages and actuates the said lever $K^6$, substantially as described.

16. The combination, with the oscillating arm I and feed-rollers $k\ k'$, of shafts K K', supporting said feed-rollers, an eccentric-plug, $K^2$, supporting the shaft K', an arm, L, attached to the said eccentric-plug $K^2$, toggle-arms L' $L^2$, connected with said arm L and with the arm I, and stops or detents $L^4\ L^5$, engaging and moving said toggle-arms as the said arm I is oscillated, substantially as described.

17. The combination, with the mandrels C C', an oscillating arm, I, and a wire-guide mounted thereon, of intermittingly-rotating feed-rollers mounted upon said oscillating arm I, shafts K and K', supporting said feed-rollers, an eccentric-plug, $K^2$, mounted in the arm and affording bearing for the shaft K', an arm, L, upon said eccentric-plug, toggle-arms L' $L^2$, connected with the arm I and with the said arm L, a spring, $L^3$, acting to hold said toggle-arms in their flexed position, a spring-detent, $L^4$, engaging one of said toggle-arms for flexing the same, and an arm, $L^5$, attached to the actuating-lever F' and acting upon said toggle-arms to straighten out the latter, substantially as described.

18. The combination, with two rotating longitudinally-reciprocating conical mandrels arranged end to end, of a wire-gripper on one of said mandrels, comprising a stationary jaw and a movable jaw, said movable jaw being attached to a sliding bar mounted in the mandrel and constructed for actuation by the endwise pressure of the other mandrel when said mandrels are brought together, substantially as described.

19. The combination, with two revolving and longitudinally-reciprocating conical mandrels arranged end to end, and a wire-guide movable endwise with relation to the mandrels, of stationary guard pins or fingers $b^3$ $b^3\ b^3$, surrounding the end of one of the mandrels, substantially as described.

20. The combination, with two rotating longitudinally-reciprocating conical mandrels arranged end to end, and a wire-guide movable longitudinally with relation to the mandrels, of means for discharging finished springs, consisting of a plurality of revolving arms located beneath the said mandrels, and means giving intermittent rotary motion to said arms, substantially as described.

21. The combination, with rotating and longitudinally-movable conical mandrels arranged end to end, and a wire-guide movable longitudinally with relation to said mandrels, of a wire-cutting device embracing stationary and movable cutters arranged in alignment with the wire-guide when the latter is at the extreme limit of the forward movement, a pivoted lever supporting said movable cutter, a pivoted dog, $N^4$, connected with said lever, and a wheel carrying a pin, $N^5$, constructed to engage said dog for actuating the movable cutter, substantially as described.

In testimony that I claim the foregoing as my invention I affix my signature in presence of two witnesses.

CHRISTIAN C. HILL.

Witnesses:
C. CLARENCE POOLE,
E. B. ELLIAS.